United States Patent [19]

Czajka et al.

[11] 4,394,871

[45] Jul. 26, 1983

[54] PROGRAMMABLE PRESSURE REGULATOR FOR TITANIUM SUPERPLASTIC FORMING APPARATUS

[75] Inventors: Dennis C. Czajka; David P. Nordstrand, both of Bellevue, Wash.

[73] Assignee: The Boeing Company, Seattle, Wash.

[21] Appl. No.: 221,786

[22] Filed: Dec. 31, 1980

[51] Int. Cl.³ .................................................. G05D 11/00
[52] U.S. Cl. .................................. 137/115; 137/487.5; 137/624.11
[58] Field of Search ............... 137/487.5, 486, 624.11, 137/624.2, 102, 115

[56] References Cited

U.S. PATENT DOCUMENTS 3,726,307 4/1973 Carman .......................... 137/487.5
4,120,631 10/1978 Leutner ............................ 425/145

Primary Examiner—Alan Cohan
Attorney, Agent, or Firm—Christensen, O'Connor, Johnson & Kindness

[57] ABSTRACT

Disclosed is a programmable pressure regulator for a titanium superplastic forming apparatus. The regulator meters an inert gas, such as argon, into and out of a forming chamber to vary the pressure according to a preselected pressure profile. A profile generator generates high and low set point pressure signals which vary in accordance with the preselected pressure profile. A pressure transducer provides an electrical signal representative of the pressure in the forming chamber. A comparator circuit compares the electrical signal from the pressure transducer with the high and low set point signal and energizes pressure and bleed gas solenoid valves to maintain the pressure in the chamber within the pressure limits defined by the set point signals.

7 Claims, 3 Drawing Figures

PROGRAMMABLE PRESSURE REGULATOR FOR TITANIUM SUPERPLASTIC FORMING APPARATUS

BACKGROUND OF THE INVENTION

The present invention relates generally to pressure regulators and controllers and, more particularly, to pressure regulator systems for metal forming processes, particularly titanium superplastic forming.

In a process known as superplastic forming of titanium, a titanium article is formed by heating titanium sheet stock to a plastic state in a furnace and pressing it against a mold, or die, under force of a pressurized inert gas, usually argon. In an improved version of this process, the argon pressure is varied with time over a critically defined pressure profile such that the titanium sheet stock undergoes deformation at a relatively slow and substantially constant strain rate throughout the forming process. The actual pressure profile as a function of time is determined in each case by the shape of the die and the article to be formed thereof, the thickness of the titanium stock, and other factors. The requisite pressure profile differs substantially from one article to another, and each profile is typically a relatively complex, nonlinear function. The absolute gas pressures required range from 25 to 500 psi or more, and must be maintained for periods of a few seconds to a few hours. There has not been available previously a pressure regulator suitable for varying the argon pressure in the forming chamber in accordance with such predetermined pressure profiles.

Certain aspects of the improved titanium forming method render regulation of the argon pressure by conventional devices and methods impractical. First, the argon pressure must be rigorously maintained within a narrow pressure window defined by upper and lower pressure limits, which limits vary continuously in a nonlinear manner over time. As mentioned above, the actual profile over which the limits vary depends in each case on the shape of the forming die and the thickness of the titanium sheet stock. Secondly, the volume of argon gas within the pressure chamber is often quite small, on the order of two to three cubic inches, such that conventional pressure regulator devices are typically incapable of providing the precise control necessary to maintain the pressure in the chamber within the desired pressure limits. Further, the progressive deformation of the titanium stock continuously changes the volume of the argon gas in the forming chamber, such that the pressure regulator must be capable of controlling the pressure in accordance with the predetermined profile even as the volume inside the forming chamber is changing. Finally, the temperature inside the chamber is also varied over the course of a forming cycle, another variable that tends to vary the chamber pressure and which must be compensated for by the pressure regulator.

A typical pressurization cycle may last up to several hours. The success of the cycle is dependent on strict regulation of the argon pressure in accordance with the predetermined profile. Since even relatively transient excursions from the profile may represent a failure in the system, it is desirable to provide a warning indicator to indicate the occurrence of an excursion of the chamber pressure outside predetermined pressure limits for an extended period of time, for example, 30 seconds. Such a prolonged excursion is ordinarily indicative of a failure condition, such as bursting of the titanium stock or a leak in the apparatus. In the event of such a failure, even if only transient, it is usually desirable to terminate the run and start over.

Accordingly, it is the object and purpose of the present invention to provide a pressure regulator for a metal forming chamber, particularly a titanium superplastic forming chamber.

It is also an object and purpose of the present invention to provide a pressure regulator capable of regulating gas pressure over a programmable, predetermined pressure profile.

It is a further object and purpose of the present invention to provide a pressure regulator capable of regulating argon pressure in a titanium superplastic forming chamber, particularly a chamber of relatively small volume and maintained at a high temperature.

It is a further object to provide a pressure regulator attaining the foregoing objects and purposes and which includes a warning indicator to provide an indication of pressure excursions outside predetermined high and low pressure limits for greater than a predetermined period of time.

It is yet another object to provide a pressure regulator that obtains the foregoing objects and purposes and which also enables the pressure in the forming chamber to be rapidly reduced by opening of a dump valve either manually or under program control from the regulator.

SUMMARY OF THE INVENTION

In accordance with the present invention, a programmable pressure regulator for a titanium superplastic forming apparatus meters an inert gas into and out of a forming chamber to vary the pressure in the chamber according to a preselected pressure profile. A programmable profile generator produces time-varying high and low set point signals which generally follow the preselected profile and which represent upper and lower pressure limits defining a pressure "window". More specifically, the high and low set point signals produced by the profile generator vary according to high and low set point profiles which are selected by the operator and defined by sets of data points which are stored as ditigally encoded data in the profile generator.

A pressure sensor coupled to the forming chamber produces a pressure signal representative of the gas pressure in the chamber. A comparator circuit continuously compares the pressure signal with the high and low set point signals from the profile generator and actuates a set of solenoid-actuated valves in a feedback manner to seek to maintain the gas pressure in the forming chamber within the specified pressure window.

For example, in the event the gas pressure in the chamber is too low, as represented by the pressure signal being lower than the low set point signal, the comparator circuit actuates a solenoid-actuated pressure valve to admit gas from a high pressure source into the forming chamber. Similarly, in the event the gas pressure in the chamber is too high, the comparator circuit actuates a solenoid-actuated valve to bleed gas from the chamber to the atmosphere.

The pressure regulator preferably includes a timer which is triggered by a pressure excursion outside the window defined by the set point signals. After timing for a predetermined period of time, the timer actuates a warning light or alrarm to indicate the occurrence of a probable failure condition, for example, a blowout of the titanium stock.

In another aspect of the invention, flow restrictors are interposed downstream from each control solenoid-actuated valve. The flow restrictors operate to enable the solenoid valves to regulate the pressure in a very small chamber volume by limiting the mass flow rate to and from the chamber through the valves.

There is also preferably a solenoid actuated dump valve coupled to the forming chamber for quickly exhaust gas from the pressure chamber in the event of a blowout or other failure condition. The dump valve is preferably connected to the profile generator to enable exhausting of the chamber at the end of each run on programmed command from the profile generator. The dump valve may also be actuated manually.

These and other aspect of the pressure regulator of the present invention are set forth more completely in the accompanying FIGURES and the following detailed description of the preferred embodiment.

DETAILED DESCRIPTION OF THE PREFERRED EMBODIMENT

Figure 1:
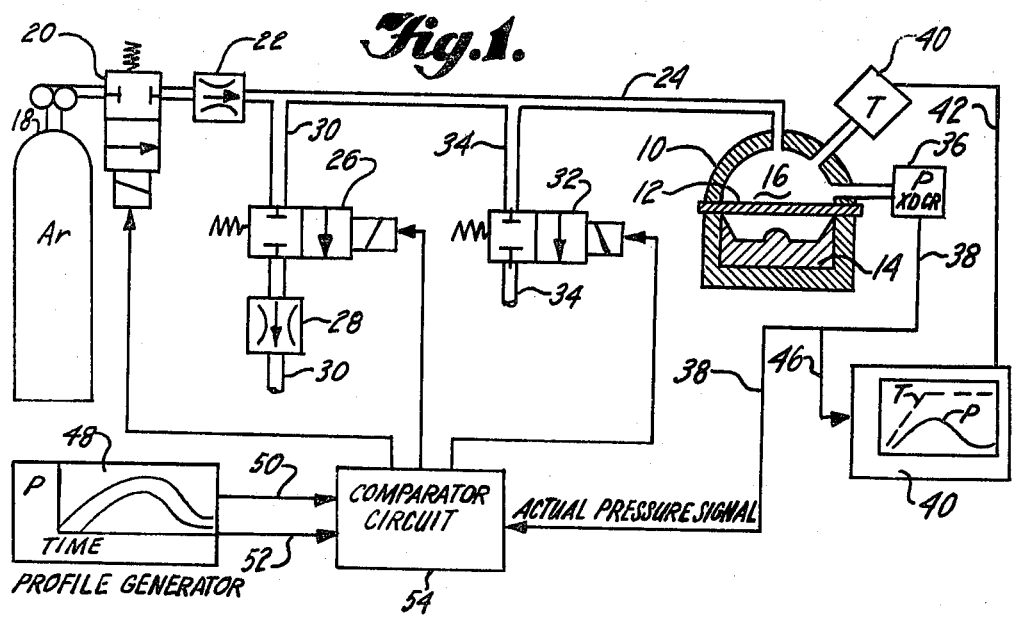
FIG. 1 is a simplified schematic diagram of the programmable pressure regulator of the present invention, as it is adapted to regulate the pressure of argon gas in a titanium superplastic forming chamber.

Referring to FIG. 1, the preferred embodiment of the programmable pressure regulator of the present invention is illustrated in simplified schematic form as it is adapted to control the gas pressure in a titanium forming chamber 10. Titanium articles are made in the forming chamber 10 according to the superplastic forming process by heating a sheet of titanium shock 12 to a plastic state and forcing the plasticized titanium sheet against a die, or mold 14. More specifically, the titanium sheet stock 12 is clamped rigidly about its peripheral edges, indicated schematically in FIG. 1 as being clamped between the upper and lower halves of the forming chamber 10. The atmosphere above and below the titanium sheet stock 12 is purged of air to prevent oxidation and/or hydrogen embrittlement of the titanium. The titanium stock is then heated to a temperature of approximately 1650° F. and the cavity 16 above the titanium sheet stock is pressurized with an inert gas, preferably argon, to press the plasticized titanium sheet 12 against the die 14. As described further below, the pressurization is carried out over a period of time, during which the argon pressure is varied in accordance with a preselected pressure profile.

The argon pressure in chamber 16 is increased by admitting argon from a source of high pressure argon 18 through a normally closed, solenoid-actuated pressure increase valve 20 and an associated flow restrictor 22 interposed in series in a conduit 24 coupled to forming chamber 10 and opening into the cavity 16. The pressure in the cavity 16 may be reduced by bleeding argon through a normally closed, solenoid-actuated pressure relief, or bleed valve 26 and an associated flow restrictor 28 interposed in series in a second conduit 30 which is coupled to conduit 24 at one end and open to the atmosphere at its opposite end. Alternatively, the argon pressure in the forming chamber 10 may be rapidly reduced, as in an emergency or at the end of a run, by exhausting argon to the atmosphere through a normally closed, solenoid-actuated dump valve 32 interposed in a third conduit 34 coupled to conduit 24.

A pressure transducer 36 is coupled to the forming chamber 10 to sense the gas pressure in the cavity 16 and provide an electrical signal representative of such pressure on a line 38. The pressure signal applied to line 38 may also be provided to a strip chart recorder 40 via line 42. A temperature transducer 44 senses the temperature in the cavity 16 and provides an electrical signal representative of such temperature on line 46 to the strip chart recorder 40. The strip chart recorder 40 provides a continuous visual record of the temperature and pressure fluctuations within the forming chamber 10.

A profile generator 48 is programmed to contain preselected sets of data which represent approximations of a high set point pressure limit profile and a low set point pressure limit profile. The set point pressure profiles are determined by the operator and will ordinarily be defined by curves which are slightly above and below a desired actual optimum pressure profile. As mentioned above, the desired actual optimum pressure profile is ordinarily a nonlinear function of time determined by the shape of the article to be formed, and other factors. The high and low set point pressure limit profiles thus define upper and lower tolerable departures from the optimum at different points in time. These thereby define a pressure "window" that continually varies with time so as to remain centered on the desired optimum pressure profile for the cavity 16 of the forming chamber 10. It is the object of the pressure regulating system to maintain the argon pressure in the cavity 16 within the selected pressure window at all times, that is, between the upper and lower limits defined by the set point pressure profiles.

The profile generator 48 provides a pair of time-varying analog set point reference signals on lines 50 and 52 to a comparator circuit 54. The set point signals provided on lines 50 and 52 are representative of the high and low set point pressure profiles, respectively. The comparator circuit 54 continuously compares the actual pressure signal received from the pressure transducer 36 on line 38 with the high and low set point signals on lines 50 and 52. As described in further detail below, the comparator circuit 54 operates to actuate the pressure increase valve 20 and the bleed valve 26 in a feedback manner so as to maintain the argon pressure in the cavity 16, as represented by the signal on line 38, within the pressure profile window defined by the high and low set point signals on lines 50 and 52.

Figure 3:
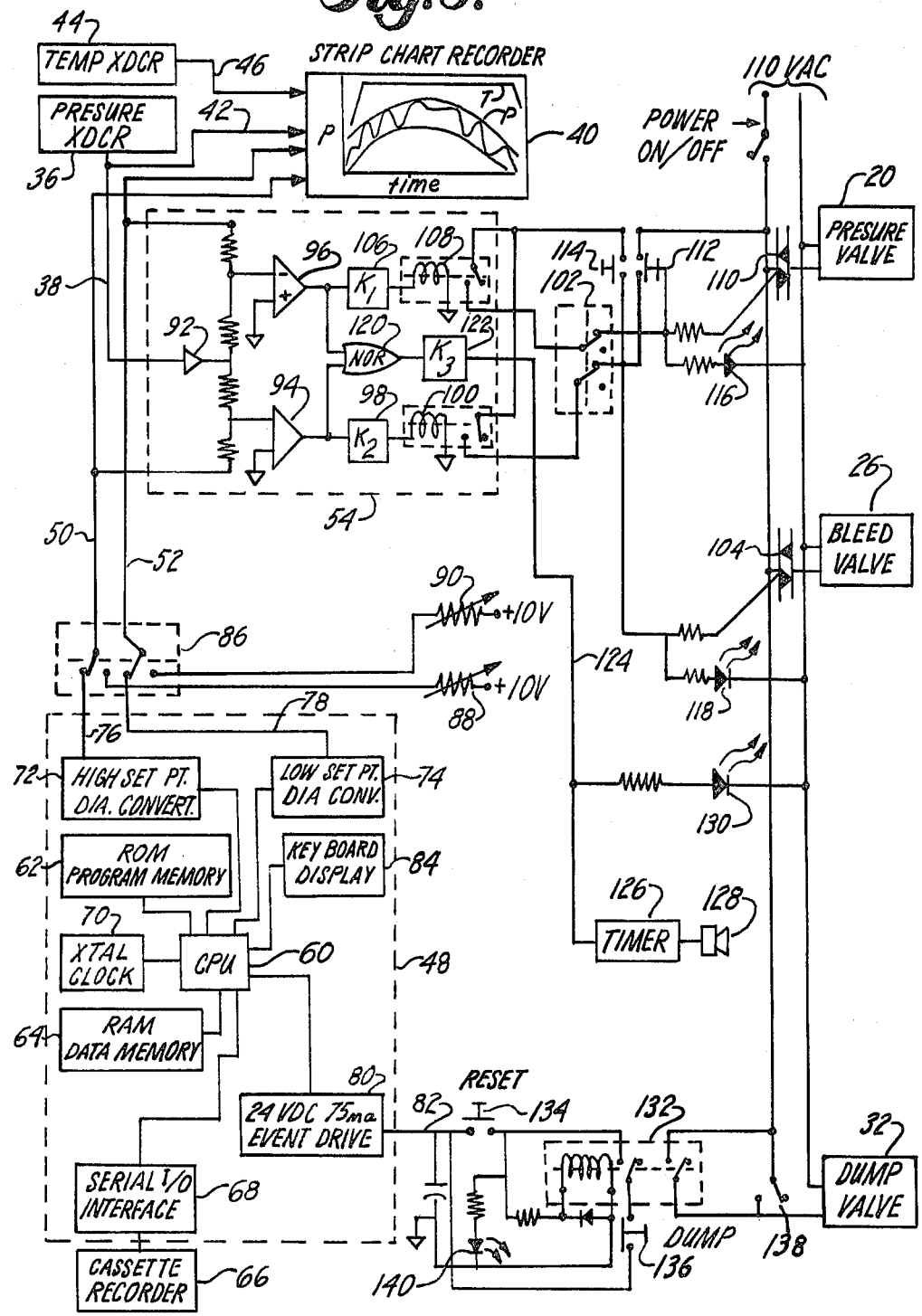
FIG. 3 is a more detailed schematic electrical diagram of the preferred embodiment of the programmable pressure regulator.

FIG. 3 illustrates the programmable pressure regulator in greater detail. Elements identified in FIG. 1 are like-numbered in FIG. 3.

Referring to FIG. 3, the profile generator 48 is a microprocessor based controller particularly adapted for the purposes of the present invention. Specifically, the profile generator 48 includes a central processing unit (CPU) 60 that executes an operational program which controls the sequence of operation of the profile generator 48. The operational program is permanently stored in a nonvolatile, read-only memory (ROM) 62, which is essentially a dedicated program memory. A volatile random-access memory (RAM) 64 stores the data defining the preselected high and low set point pressure profiles, as well as certain other variable data described further below. Since the random-access memory 64 is volatile, i.e., is erased when power is removed from the profile generator 48, data representing preselected profiles for particular titanium molds is ordinarily stored for future use on magnetic tape by means of a cassette recorder 66 which is coupled to the CPU 60 through a serial input/output interface 68. A crystal clock 70 regulates the timing functions of the CPU 60.

The CPU 60 is coupled to a high set point digital-to-analog (D/A) converter 72 and a low set point D/A converter 74. On the basis of the operational program instructions received from the ROM 62 and the set point data received from the RAM 64, the CPU provides binary coded data to the D/A converters 72 and 74, as described further below. The D/A converters 72 and 74 convert the digitally encoded data from the CPU 60 to analog signals, for example zero to 10-volt dc signals, which are applied to output lines 76 and 78, respectively, and which represent the high and low set point limits. As described further below, the high and low analog set point signals on lines 76 and 78 represent, at any point in time, the specified upper and lower pressure limits for the forming chamber 10.

The profile generator 48 further includes an event driver 80 that operates in an ON/OFF mode to provide an electrical signal, for example, a 0 or 24-volt, 75-milliamp dc signal, on an output line 82 on receipt of an appropriate digitally encoded signal from the CPU 60. The profile generator 48 further includes a combined keyboard and display terminal 84 by which set point profile data is manually entered, visually verified and stored in the memory 64 of the profile generator 48.

A suitable profile generator for use in the preferred embodiment of the pressure regulator is commercially available from Research, Inc., of Minneapolis, Minn., by whom it is identified as a Model 5600 Data-Trak process programmer.

The high and low analog set point signals on lines 76 and 78 are applied to terminals of a double-pole, double-throw switch 86. In its normal operating position for programmed pressure control, the switch 86 connects lines 76 and 78 to the input lines 50 and 52 of the comparator circuit 54. Alternatively, switching of the switch 86 from its normal position connects the comparator input lines 50 and 52 to variable potentiometers 88 and 90, respectively. The potentiometers 88 and 90 are each coupled to a dc signal source. The switch 86 effectively removes the set point inputs to the comparator circuit 54 from program control and enables manual setting of the high and low set point signals on lines 50 and 52 at any value, for example between zero and ten volts dc by means of the variable potentiometers 88 and 90, respectively.

The high and low set point signals on lines 50 and 52 are compared with the pressure signal on line 38 in the comparator circuit 54. More specifically, the pressure signal on line 38 is amplified and inverted by an inverting amplifier 92 and is then compared with the high set point signal and the low set point signal by means of operational amplifiers (op amps) 94 and 96, respectively. In the event the pressure signal on line 38 represents a pressure greater than the pressure represented by the high set point signal on line 50, the op amp 94 produces an output signal which is amplified by an amplifier 98 and applied to energize a relay 100. Energization of the relay 100 closes a circuit through a normally closed, double-throw, double-pole switch 102 to provide a signal to a control terminal of a triac 104. Actuation of the triac 104 results in energization of the solenoid of the bleed valve 26 with 110-volt ac power to thereby open the bleed valve 26 and reduce the pressure in the forming chamber 10.

Likewise, in the event the amplified pressure signal from line 38 is less than the low set point signal on line 52, the op amp 96 produces an output signal that is amplified by an amplifier 106 and applied to a relay 108 to close a circuit and energize a triac 110. Energization of the triac 110 results in application of a 110-volt ac power signal to the solenoid of the pressure valve 20 to thereby increase the argon pressure in the forming chamber 10.

The double-throw, double-pole switch 102 is for the purpose of disabling the comparator circuit 54 if desired, for example, to permit manual actuation of the bleed or pressure valve 26 or 20. Manual actuation of the valves 20 and 26 is obtained with a pair of normally open switches 112 and 114, respectively. Closing of the switch 112 energizes the triac 110 and thereby actuates the solenoid of the pressure valve 20. Similarly, closing of the switch 114 energizes the triac 104 to actuate the solenoid of the bleed valve 26. A pair of light-emitting diodes 116 and 118 are energized whenever the triacs 110 and 104, respectively, are energized, whether manually or under control of the comparator circuit, to indicate that argon is being admitted into or bled from the forming chamber 10.

The comparator circuit 54 further includes a logical NOR gate 120 which receives as inputs the outputs of the op amps 94 and 96. The NOR gate 120 produces an output signal whenever neither of the op amps 94 and 96 is producing an output signal, i.e., whenever the pressure in the forming chamber is between the high and low set point pressure limits. The output of the NOR gate 120 is amplified by an amplifier 122 and applied via line 124 to a timer 126 which is coupled to an acoustical alarm 128. The timer 126 begins timing whenever the signal provided on line 124 ceases. After 30 seconds of uninterrupted timing, the timer 126 energizes the acoustical alarm 128 to indicate audibly the presence of a probable failure condition, such as rupturing of the titanium sheet stock, an empty argon tank or a failure of the pressurization apparatus. A light-emitting diode 130 coupled to line 124 is normally on and indicates that the pressure within the forming chamber is between the high and low set point limits and that neither the bleed valve 26 nor the pressure valve 20 is open.

A comparator circuit 54 suitable for use in the preferred embodiment of the pressure regulator, and actually used in one embodiment, is effectively embodied in a commercially available circuit sold by Calex Manufacturing Company, Inc., Pleasant Hill, Calif. and identified as a multifunction voltsensor, model numbers 545 and 546.

The dump valve 32 is a two-way, normally open solenoid valve. In normal operation, a latching relay 132 is latched in an energized state so as to close a circuit providing 110-volt ac current to close the dump valve 32. The relay 132 is normally energized by a 24-volt, 75-milliamp dc signal provided by the event driver 80 on line 82. On initial energization of the profile generator 48 and associated event driver 80 to provide a driving signal on line 82, the relay 132 is latched into the energized state by manually closing a normally open reset switch 134. Once the relay 132 is energized and latched on, the dump valve 32 may be opened automatically under program control from the profile generator 48 by termination of the 24-volt signal produced by the event driver 80. Alternatively, the dump valve 32 may be opened by manually opening a normally closed dump switch 136 to unlatch and deenergize the relay 132. The operation of the dump valve 32 may be removed from the control of the profile generator 48 by closing of a normally open enable/disable switch 138. Closing the switch 138 applies ac power to the dump valve 32 to maintain it in a closed state and disable the dump valve circuit.

A light-emitting diode 140 is energized when the relay 132 is energized to indicate that the dump valve circuit is under control of the profile generator 48.

During the normal course of a pressurization cycle, which may last up to several hours, the argon in the forming chamber 10 undergoes large variations in volume, temperature, and pressure. Because the pressures are high and the volume of the argon gas in the chamber is often small, it is difficult to obtain precise pressure control with commercially available solenoid valves. Accordingly, commercially available solenoid valves are employed in combination with the flow restrictors 22 and 28 which are placed downstream from and in close proximity to the bleed and pressure valves 26 and 20, respectively. The flow restrictors 22 and 28 function as orifices to substantially limit the mass flow rate through the valves 20 and 26 respectively. It is found that optimum sizing of the flow restrictors 22 and 28 is a complex function of the time-varying chamber volume, the time-varying chamber pressure, compression heating, and other factors. Accordingly, a selection of interchangeable flow restrictors is ordinarily kept on hand, with the particular restrictor size for any given run being selected as required. Because of the sometimes very small flow rates required of the flow restrictors, it is preferable to employ flow restrictors utilizing the principle of inertial flow restriction, as opposed to a flow restrictor employing a simple orifice. In inertial flow restriction, the gas is forced to pass through a tortuous pathway so as to undergo numerous changes in direction, such that effective flow restriction is obtained with passageways that are larger in diameter than would be required to obtain the same degree of flow restriction with a simple orifice, or set of orifices. For example, in one suitable flow restrictor manufactured by the Lee Company of Westbrook, Conn., and identified as a Visco Jet flow restrictor, gas is forced to pass in series through a set of spin chambers connected by central orifices. The configuration of the spin chambers causes the gas to undergo a swirling motion that changes in direction from one chamber to the next and which effectively inhibits its passage through the central orifice of each spin chamber. As a result, effective flow restriction can be obtained with relatively large orifices in each spin chamber, with consequent decrease in the likelihood of problems arising from contamination, clogging and erosion of the orifices.

The profile generator 48 operates in three primary operating modes, designated MANUAL, RUN, and PROGRAM modes. The MANUAL mode is used to initialize the clock circuitry and to manually designate the outputs of the set point D/A converters 72 and 74 and the event output 80. As noted above, the outputs produced by the high and low set point D/A converters 72 and 74 are, in one actual embodiment, zero to ten-volt dc signals. The event output 80 is capable of producing a number of independently controlled zero or 24-volt dc, 75 milliamp output signals for external relay drives. Normally, however, only the one output signal applied to line 82 and used to drive the dump valve relay 132 is utilized.

The RUN mode is used to execute the operational program stored in the read-only memory 62. The program operates on the preselected data parameters defining the desired pressure set point profiles, which are stored in the random access memory 64. The program operation may be monitored in the RUN mode by pressing a desired function key and observing the corresponding display output on the keyboard display. The RUN mode can be initialized in either a manual start or auto-start sequence. In the manual start sequence, the operating program is initialized by entering the starting or first segment of the program segment and pressing a RUN key on the keyboard. In the auto-start sequence, the profile generator 48 is set to start at a specific time of day. A single-step RUN mode is also available to permit the operator to manually advance the program a single step at a time with the analog and event outputs active.

The PROGRAM mode is used to enter and verify the data which define the high and low pressure profiles. The desired set point profiles are approximated by sets of linear profile segments, as indicated by the high and low set point profiles 150 and 152 illustrated graphically in FIG. 2. In the PROGRAM mode, the operator sequentially enters the desired time duration for each program segment, illustrated in FIG. 2 as segments $t_1$ through $t_{51}$, as well as the numerical values of the high and low set points at the beginning and end of each time segment of the profile. Also, the timing of event outputs, repeat cycles, and stop instructions is controlled by entry of appropriate parameters into the RAM 64 in the PROGRAM mode.

More specifically, each set point profile is divided into a finite number of segments which correspond to specified periods of time. The number of segments employed is determined by the precision with which the operator wishes to approximate the desired pressure curves with linear segmented versions of such curves. In one actual preferred embodiment, each profile is divided into 51 segments, as illustrated graphically in FIG. 2. In defining a profile, the operator specifies the duration of each segment in seconds or minutes. Also, the operator specifies the values of the high and low set points at the beginning and end of each segment. In practice, the high and low set points are specified as numerals from 0 to 100, which correspond proportionally to the analog set point outputs signals ranging from zero to ten volts dc. It is found that, for the purpose of the titanium forming process, an optimum spread between the high and low set point values is two to three percent of the high set point value. For example, a high set point value of 50 in a particular program segment would ordinarily be accompanied by a low set point value of 49. The spread between the set point profiles is exaggerated in FIG. 2 for the purpose of illustration.

Figure 2:
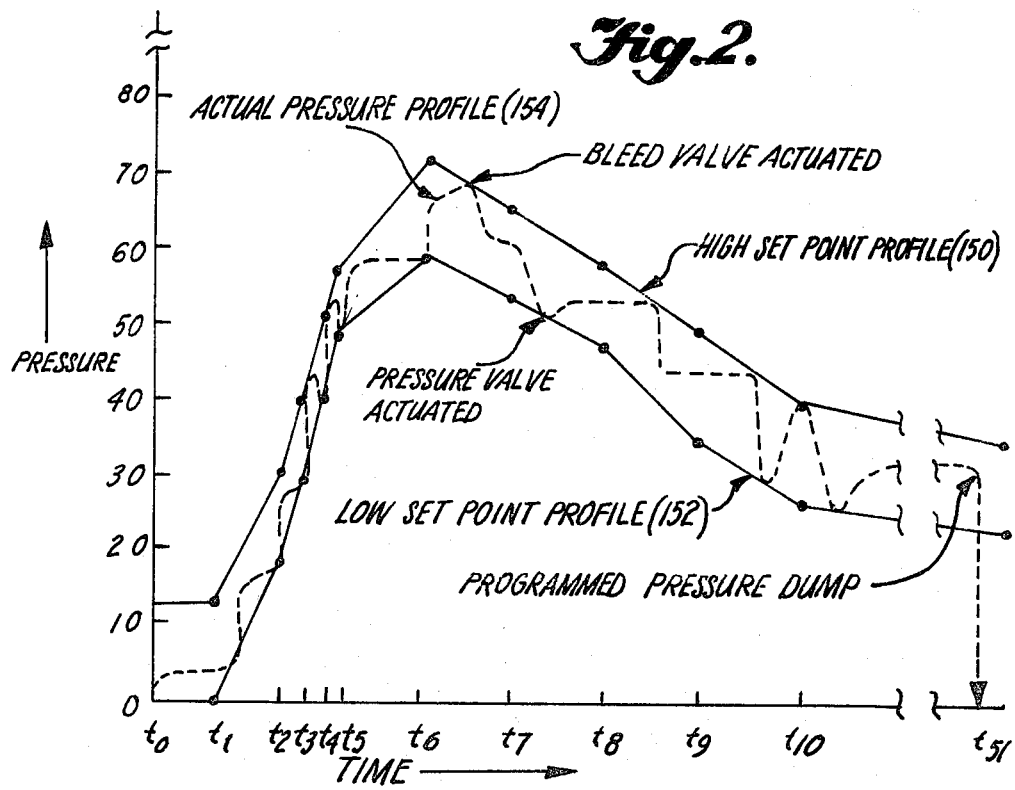
FIG. 2 is a graphical illustration of an example of an actual pressure profile, encountered during a pressurization cycle, together with the accompanying high and low set point profiles produced by the profile generator.

During the running of the program in the RUN mode, the profile generator CPU 60 interpolates between the designated set point values for the beginning and end of each segment and produces periodically updated, digitally encoded signals which are applied to the D/A converters 72 and 74 to produce substantially linear profile segments. The outputs of the D/A converters 72 and 74, although incrementally varied under program control, are varied rapidly and by sufficiently small increments as to produce essentially linear profile segments, as illustrated in FIG. 2. The profile generator 48 thus generates the high and low set point pressure profiles, each of which consists of a series of connected linear segments, and which approximate to the desired degree of precision the desired pressure profile. The set point profiles define a pressure window that varies continuously with time.

A graphical illustration of a pressurization cycle is illustrated in FIG. 2. The pressure within the chamber 10, represented by the dashed actual pressure profile 154, fluctuates, to some extent erratically, within the bounds of the high and low pressure profiles 150 and 152. At the end of the run, the dump valve 132 is opened under program control to terminate the cycle.

It will be noted in FIG. 2 that the various time segments illustrated, designated $t_1$ through $t_8$, are not necessarily equal in duration. The vertical distance between the high and low pressure profiles 150 and 152 at any point in time represents the width of pressure window that time. As previously noted, the width of the pressure window is ordinarily approximately two to three percent, and is exaggerated in FIG. 2 for the purpose of illuatration.

Although the present invention is described and illustrated by reference to a preferred embodiment, it will be understood that various alterations, modifications, and substitutions may be made without departing from the spirit of the invention. Accordingly, the scope of the present invention is defined by the following claims.

The embodiments of the invention in which an exclusive property or privilege is claimed are defined as follows:

1. An apparatus for controlling gas pressure in a metal forming chamber comprising:
   a source of pressurized gas;
   first electrically responsive valve means interposed between said source of pressurized gas and said forming chamber and operable in response to an electrical signal to admit gas from said pressurized source to said forming chamber;
   second electrically responsive valve means coupled to said forming chamber, said second valve means being operable in response to an electrical signal to bleed gas from said forming chamber;
   pressure-sensing means coupled to said forming chamber, said sensing means being operable to produce a signal representative of the pressure of said gas in said chamber;
   a profile generator operable to produce time varying high and low set point signals representative of preselected upper and lower pressure limits of a series of linear profile segments, each segment enduring for a predetermined period of time during which said set point signal varies linearly from a first set point level to a second set point level;
   comparator means for comparing said electrical signal from said pressure-sensing means with each of said high and low set point signals, said comparator means operating to apply an electrical signal to said first electrically responsive valve means in the event the difference between said electrical signal from said pressure-sensing means and said low set point signal represents a pressure in said forming chamber less than said lower pressure limit, said comparator means further operating to provide an electrical signal to said first electrically responsive valve means in the event the difference between said upper set point signal and said signal from said pressure-sensing means represents a gas pressure in said chamber greater than said upper pressure limit.

2. An apparatus for controlling gas pressure in a metal forming chamber comprising:
   a source of pressurized gas;
   first electrically responsive valve means interposed between said source of pressurized gas and said forming chamber and operable in response to an electrical signal to admit gas from said pressurized source to said forming chamber;
   second electrically responsive valve means coupled to said forming chamber for bleeding gas from said forming chamber, said second valve means being operable in response to an electrical signal to bleed gas from said forming chamber;
   third electrically responsive dump valve means coupled to said forming chamber for exhausting gas relatively rapidly from said forming chamber and thereby reducing the pressure of said gas in said forming chamber to ambient atmospheric pressure;
   pressure-sensing means coupled to said forming chamber, said sensing means being operable to produce a signal representative of the pressure of said gas in said chamber;
   a profile generator operable to produce time varying high and low set point signals representative of preselected upper and lower pressure limits;
   comparator means for comparing said electrical signal from said pressure-sensing means with each of said high and low set point signals, said comparator means operating to apply an electrical signal to said first electrically responsive valve means in the event the difference between said electrical signal from said pressure-sensing means and said low set point signal represents a pressure in said forming chamber less than said lower pressure limit, said comparator means further operating to provide an electrical signal to said first electrically responsive valve means in the event the difference between said upper set point signal and said signal from said pressure-sensing means represents a gas pressure in said chamber greater than said upper pressure limit.

3. The apparatus defined in claim 1 or 2 further comprising flow restrictor means coupled to each of said first and second electrically responsive valve means for regulating flow of said pressurized gas into said chamber and flow of gas from said chamber to the atmosphere, respectively.

4. The apparatus defined in claim 3, wherein said flow restrictor means comprise inertial flow restrictors coupled in fluid communication in series with said valve means for limiting the mass flow rate of said gas through said valve means.

5. The apparatus defined in claim 1 or 2 further comprising a timing means coupled to the output of said comparator means, said timing means operating to energize an alarm indicative of a failure condition in the event the difference between said electrical signal from said pressure sensing means and said high and low set point signals represents a pressure in said forming chamber outside said preselected upper and lower pressure limits for more than a predetermined period of time.

6. The apparatus defined in claim 1 or 2 further comprising means for providing manually selectable high and low set point signals representative of preselected upper and lower pressure limits, and means for applying said signals to said comparator means.

7. The apparatus defined in claim 1 or 2 further comprising: means for enabling manual control of said first and second electrically responsive valve means under program control by said comparator means.

* * * * *

UNITED STATES PATENT AND TRADEMARK OFFICE
CERTIFICATE OF CORRECTION

PATENT NO. : 4,394,871

DATED : July 26, 1983

INVENTOR(S) : Czajka et al.

It is certified that error appears in the above-identified patent and that said Letters Patent is hereby corrected as shown below:

| | |
|---|---|
| Column 1, | line 22: "thereof" should be --thereon-- |
| Column 2, | lines 44-45: "ditigally" should be --digitally-- |
| Column 2, | line 68: "alrarm" should be --alarm-- |
| Column 3, | lines 10-11: "exhaust" should be --exhausting-- |
| Column 3, | line 17: "aspect" should be --aspects-- |
| Column 8, | line 55: "outputs" should be --output-- |
| Column 10, | line 3: "first" should be --second-- |
| Column 10, | line 44: "first" should be --second-- |

Signed and Sealed this

Eighth Day of May 1984

[SEAL]

Attest:

GERALD J. MOSSINGHOFF

Attesting Officer

Commissioner of Patents and Trademarks